US012723680B1

(12) United States Patent
Baldwin et al.

(10) Patent No.: US 12,723,680 B1
(45) Date of Patent: Sep. 1, 2026

(54) UNIBODY SNAP-IN ELECTRICAL BOX CABLE CLAMP

(71) Applicant: Titan3 Technology LLC, Tempe, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 363 days.

(21) Appl. No.: 18/143,833

(22) Filed: May 5, 2023

Related U.S. Application Data

(60) Provisional application No. 63/342,019, filed on May 13, 2022.

(51) Int. Cl.
*H02G 3/08* (2006.01)
*F16B 2/24* (2006.01)
*F16L 5/00* (2006.01)

(52) U.S. Cl.
CPC ................ *F16L 5/00* (2013.01); *F16B 2/243* (2013.01); *H02G 3/08* (2013.01)

(58) Field of Classification Search
CPC .................................. F16L 5/00; F16B 2/243
See application file for complete search history.

(56) References Cited

U.S. PATENT DOCUMENTS 834,684 A * 10/1906 Sibley et al. ........ H02G 3/0683 285/154.4
1,384,332 A * 7/1921 Mullenux ............... B25B 27/10 285/332.3
1,418,990 A 6/1922 Thomas, Jr.
1,644,306 A * 10/1927 Ledbetter ............. H02G 3/0683 16/108
1,776,652 A * 9/1930 Clayton .................... F16B 2/10 285/154.3
2,097,695 A 11/1937 Kingdon
2,200,874 A * 5/1940 Dann .................. H02G 3/0683 285/154.3
3,174,776 A 3/1965 Berger
3,245,703 A * 4/1966 Manly ................. F16L 37/0847 285/347
3,346,863 A * 10/1967 Siebold .................... H01Q 7/00 343/702
3,647,934 A * 3/1972 Hurtt .................... H02G 3/0616 285/248
3,788,582 A 1/1974 Swanquist
(Continued)

*Primary Examiner* — Jason W San
(74) *Attorney, Agent, or Firm* — Kenneth C. Booth; Booth Udall, PLC

(57) ABSTRACT

A snap-in electrical box cable clamp with a main body, a clamp, and a plurality of clips. The main body is configured to provide a pathway for an electrical cable through a wall opening in a wall of an electrical box. The clamp has a screw that is configured to tighten the clamp to grip the electrical cable. The clips originate from the main body and extend away from the main body. Each clip of a first portion of the clips is oriented in a downward direction and each clip of a second portion is oriented in an upward direction opposite the downward direction. Each clip of the first portion may be vertically aligned with a corresponding clip of the second portion to form a pair of clips configured to snap onto and hold the cable clamp to an edge of the wall opening of the electrical box.

17 Claims, 21 Drawing Sheets

(56) References Cited

U.S. PATENT DOCUMENTS

| | | | | | |
|---|---|---|---|---|---|
| 3,858,151 | A | | 12/1974 | Paskert | |
| 4,005,882 | A | * | 2/1977 | Rickel | F16L 5/00 285/23 |
| 4,361,302 | A | * | 11/1982 | Lass | F16L 5/00 174/665 |
| 4,536,613 | A | | 8/1985 | Gallas | |
| 4,880,387 | A | * | 11/1989 | Stikeleather | H01R 4/64 174/653 |
| 4,990,721 | A | * | 2/1991 | Sheehan | H02G 3/0666 174/661 |
| 5,204,499 | A | * | 4/1993 | Favalora | H02G 3/0691 174/669 |
| 5,647,613 | A | * | 7/1997 | Marik | H01R 13/5812 285/154.3 |
| 5,894,109 | A | | 4/1999 | Marik | |
| 5,921,520 | A | * | 7/1999 | Wisniewski | F16L 3/12 248/316.1 |
| 6,257,530 | B1 | * | 7/2001 | Tsai | F16L 3/127 248/74.2 |
| 6,352,439 | B1 | * | 3/2002 | Stark | F16L 37/008 439/142 |
| 6,596,939 | B1 | * | 7/2003 | Gretz | F16L 5/00 174/152 G |
| 6,827,604 | B1 | | 12/2004 | White | |
| 6,861,585 | B1 | | 3/2005 | Kiely | |
| 6,872,886 | B2 | | 3/2005 | Kiely | |
| 6,935,890 | B1 | | 8/2005 | Gretz | |
| 6,935,891 | B2 | | 8/2005 | Kiely | |
| 6,957,968 | B1 | * | 10/2005 | Gretz | H01R 13/6583 174/661 |
| 7,048,561 | B1 | | 5/2006 | Elbaz | |
| 7,057,107 | B2 | * | 6/2006 | Auray | H02G 3/0691 439/535 |
| 7,060,900 | B1 | | 6/2006 | Gretz | |
| 7,064,273 | B1 | | 6/2006 | Kiely | |
| 7,075,007 | B2 | | 7/2006 | Auray | |
| 7,211,744 | B2 | | 5/2007 | Jorgensen | |
| 7,222,394 | B2 | | 5/2007 | Gardner | |
| 7,325,838 | B2 | | 2/2008 | Gardner | |
| 7,390,980 | B1 | * | 6/2008 | Gretz | H02G 3/06 174/666 |
| 7,432,452 | B2 | | 10/2008 | Gardner | |
| 7,485,806 | B1 | | 2/2009 | Gretz | |
| 7,495,184 | B1 | | 2/2009 | Gretz | |
| 7,703,813 | B1 | | 4/2010 | Kiely | |
| 7,723,623 | B2 | | 5/2010 | Kiely | |
| 7,824,213 | B1 | | 11/2010 | Korcz | |
| 8,143,535 | B2 | | 3/2012 | Auray | |
| 8,162,693 | B2 | | 4/2012 | Auray | |
| 8,253,043 | B1 | | 8/2012 | Kiely | |
| 8,466,378 | B1 | | 6/2013 | Gretz | |
| 8,690,194 | B1 | * | 4/2014 | Smith | F16L 25/01 285/154.4 |
| 8,791,374 | B1 | * | 7/2014 | Smith | H02G 3/0616 174/530 |
| 8,800,120 | B2 | * | 8/2014 | Benedetti | F16B 5/0642 24/282 |
| 8,803,008 | B2 | * | 8/2014 | Chavan | H02G 3/0616 439/210 |
| 8,901,441 | B2 | | 12/2014 | Sathyanarayana | |
| 9,231,388 | B2 | * | 1/2016 | Chavan | H02G 3/0608 |
| 9,293,900 | B1 | * | 3/2016 | Gretz | H02G 3/0683 |
| 9,373,919 | B1 | | 6/2016 | Smith | |
| 9,431,808 | B1 | * | 8/2016 | Perkins | H02G 3/22 |
| 9,444,235 | B1 | | 9/2016 | Smith | |
| 9,490,061 | B2 | | 11/2016 | Park | |
| 9,490,619 | B2 | | 11/2016 | Smith | |
| 9,705,296 | B1 | * | 7/2017 | Smith | H02G 3/0616 |
| 9,865,972 | B2 | | 1/2018 | Smith | |
| 9,935,435 | B2 | | 4/2018 | Smith | |
| 10,135,230 | B1 | | 11/2018 | Smith | |
| 10,269,473 | B1 | * | 4/2019 | Gretz | H02G 3/06 |
| 10,483,735 | B1 | * | 11/2019 | Gretz | H02G 3/0481 |
| 10,593,445 | B2 | | 3/2020 | Gretz | |
| 10,601,189 | B1 | * | 3/2020 | Smith | H01R 13/745 |
| 10,892,610 | B2 | * | 1/2021 | Smith | H02G 3/0691 |
| 10,923,894 | B1 | | 2/2021 | Gretz | |
| 11,015,751 | B2 | | 5/2021 | Dhotre | |
| 11,223,168 | B2 | | 1/2022 | Gretz | |
| 11,451,030 | B2 | * | 9/2022 | Yang | H02G 3/083 |
| 11,456,582 | B1 | * | 9/2022 | Baldwin | F16L 3/1091 |
| 11,649,858 | B2 | * | 5/2023 | Plioska | B60N 2/897 384/125 |
| 11,784,428 | B2 | * | 10/2023 | Smith | F16B 2/241 248/74.2 |
| 11,815,206 | B2 | * | 11/2023 | Dickinson | F16B 2/241 |
| 11,898,608 | B2 | * | 2/2024 | Itta | F16D 1/0835 |
| 2007/0261881 | A1 | | 11/2007 | Wronski | |
| 2009/0178845 | A1 | * | 7/2009 | Auray | H01R 13/745 174/666 |
| 2010/0279530 | A1 | * | 11/2010 | Auray | H02G 3/083 439/157 |
| 2010/0285699 | A1 | * | 11/2010 | Auray | H02G 3/0675 439/816 |
| 2015/0357806 | A1 | | 12/2015 | Korcz | |
| 2016/0047494 | A1 | | 2/2016 | Dickinson | |
| 2017/0163014 | A1 | | 6/2017 | Korcz | |
| 2017/0346271 | A1 | | 11/2017 | Brodeur | |
| 2020/0091643 | A1 | * | 3/2020 | Smith | F16L 3/243 |
| 2020/0224792 | A1 | * | 7/2020 | Juzak | E04B 2/7457 |
| 2021/0384714 | A1 | * | 12/2021 | Yang | H02G 3/083 |

* cited by examiner

UNIBODY SNAP-IN ELECTRICAL BOX CABLE CLAMP

CROSS REFERENCE TO RELATED APPLICATIONS

This application claims the benefit of the filing date of U.S. Provisional Patent Application 63/342,019 entitled "UNIBODY SNAP-IN ELECTRICAL BOX CABLE CLAMP" to Baldwin, et al. that was filed on May 13, 2022, the disclosure of which is hereby incorporated herein by this reference.

TECHNICAL FIELD

Aspects of this document relate generally to electrical box cable clamps, and more specifically to a unibody electrical box cable clamp.

BACKGROUND

Conventional snap-in electrical box cable clamps employ a spring temper steel ring that wraps around the body of the cable clamp. The steel ring is not a continuous loop and includes a gap between its ends to allow the spring to contract when the clamp is inserted into a cable opening of an electrical box and then expand to hold the clamp to the box after the clips on the spring pass through the opening. The wall of the electrical box surrounding the cable opening becomes loosely held between the solid ring of the main body for the cable clamp and the steel ring clips. Because the steel ring is rotatable with respect to the cable clamp, once the cable clamp is installed, it can be difficult to locate the clips to remove the cable clamp from the electrical box. Additionally, it is difficult to remove the cable clamp because all of the clips must be depressed at once.

SUMMARY

Aspects of this document relate to [ ].

Particular embodiments may comprise one or more of the following features. [ ]

Aspects of this document relate to a snap-in electrical box cable clamp comprising a hollow, cylindrical main body configured to provide a pathway for an electrical cable through a wall opening in a wall of an electrical box, a clamp positioned on a top end of the main body, the clamp having at least one screw, wherein the electrical cable passes through the clamp when the electrical cable extends along the pathway through the main body and wherein the at least one screw is configured to tighten the clamp to grip the electrical cable, a plurality of clips originating from the main body and extending away from the main body, wherein each clip of a first portion of the plurality of clips is oriented in a downward direction and each clip of a second portion of the plurality of clips is oriented in an upward direction opposite the downward direction, wherein each clip of the first portion of the plurality of clips is vertically aligned with a corresponding clip of the second portion of the plurality of clips to form a pair of clips, and wherein each pair of clips is configured to snap onto and hold the cable clamp to an edge of the wall opening of the electrical box, and a plurality of spacers originating from the main body and extending away from the main body separate from the plurality of clips, the plurality of spacers configured to wedge the main body within the wall opening.

Particular embodiments may comprise one or more of the following features. The plurality of clips may comprise two pairs of clips on opposing sides of the main body. The plurality of spacers may comprise two spacers on opposing sides of the main body. When each pair of clips is snapped onto and holding the cable clamp to the edge of the wall opening of the electrical box, the wall of the electrical box may be positioned at a midsection of the main body. A release arm integrated into the main body and configured to control a radial position of at least the second portion of at least one clip of the plurality of clips to selectively release the edge of the wall opening from being held by the second portion of the at least one clip of the plurality of clips.

Aspects of the document relate to a snap-in electrical box cable clamp comprising a hollow main body configured to provide a pathway for an electrical cable through a wall opening in a wall of an electrical box, a clamp positioned on a top end of the main body, the clamp having at least one screw, wherein the electrical cable passes through the clamp when the electrical cable extends along the pathway through the main body and wherein the at least one screw is configured to tighten the clamp to grip the electrical cable, and a plurality of clips extending away from the main body, wherein each clip of a first portion of the plurality of clips is oriented in a downward direction and each clip of a second portion of the plurality of clips is oriented in an upward direction opposite the downward direction, and wherein the plurality of clips is configured to snap onto and hold the cable clamp to an edge of the wall opening of the electrical box.

Particular embodiments may comprise one or more of the following features. The plurality of clips may originate from and each be integral with the main body. Each clip of the first portion of the plurality of clips may be vertically aligned with a corresponding clip of the second portion of the plurality of clips to form a pair of clips, and each pair of clips may be configured to snap onto and hold the clamp to an edge of the wall opening of the electrical box. A plurality of spacers may originate from the main body and extending away from the main body separate from the plurality of clips, the plurality of spacers may be configured to wedge the main body within the wall opening. The plurality of clips may comprise two pairs of clips on opposing sides of the main body wherein each pair of clips is configured to snap onto and hold the cable clamp to an edge of the wall opening of the electrical box. When the plurality of clips is snapped onto and holding the cable clamp to the edge of the wall opening of the electrical box, the wall of the electrical box may be positioned at a midsection of the main body. A release arm integrated into the main body and may be configured to control a radial position of the second portion of at least one of the plurality of clips to selectively release the cable clamp from the edge of the wall opening.

Aspects of this document relate to a snap-in electrical box cable clamp comprising a main body configured to provide a pathway for an electrical cable through a wall opening in a wall of an electrical box, a clamp positioned on a top end of the main body and configured to grip the electrical cable, wherein the electrical cable passes through the clamp when the electrical cable extends along the pathway through the main body, and a plurality of clips originating from the main body and extending away from the main body, wherein the plurality of clips is configured to snap onto and hold the cable clamp to an edge of the wall opening of the electrical box.

Particular embodiments may comprise one or more of the following features. The clamp may have at least one screw configured to tighten the clamp to grip the electrical cable. Each clip of a first portion of the plurality of clips may be oriented in a downward direction and each clip of a second portion of the plurality of clips may be oriented in an upward direction opposite the downward direction. Each clip of the first portion of the plurality of clips may be vertically aligned with a corresponding clip of the second portion of the plurality of clips to form a pair of clips and each pair of clips may be configured to snap onto and hold the cable clamp to an edge of the wall opening of the electrical box. A plurality of spacers may originate from the main body and extend away from the main body separate from the plurality of clips, the plurality of spacers may be configured to wedge the main body within the wall opening. The plurality of clips may comprise two pairs of clips on opposing sides of the main body wherein each pair of clips is configured to snap onto and hold the cable clamp to an edge of the wall opening of the electrical box. When the plurality of clips is snapped onto and holding the cable clamp to the edge of the wall opening of the electrical box, the wall of the electrical box may be positioned at a midsection of the main body. A release arm may be integrated into the main body and configured to control a radial position of a portion of at least one of the plurality of clips to selectively release the cable clamp from the edge of the wall opening.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
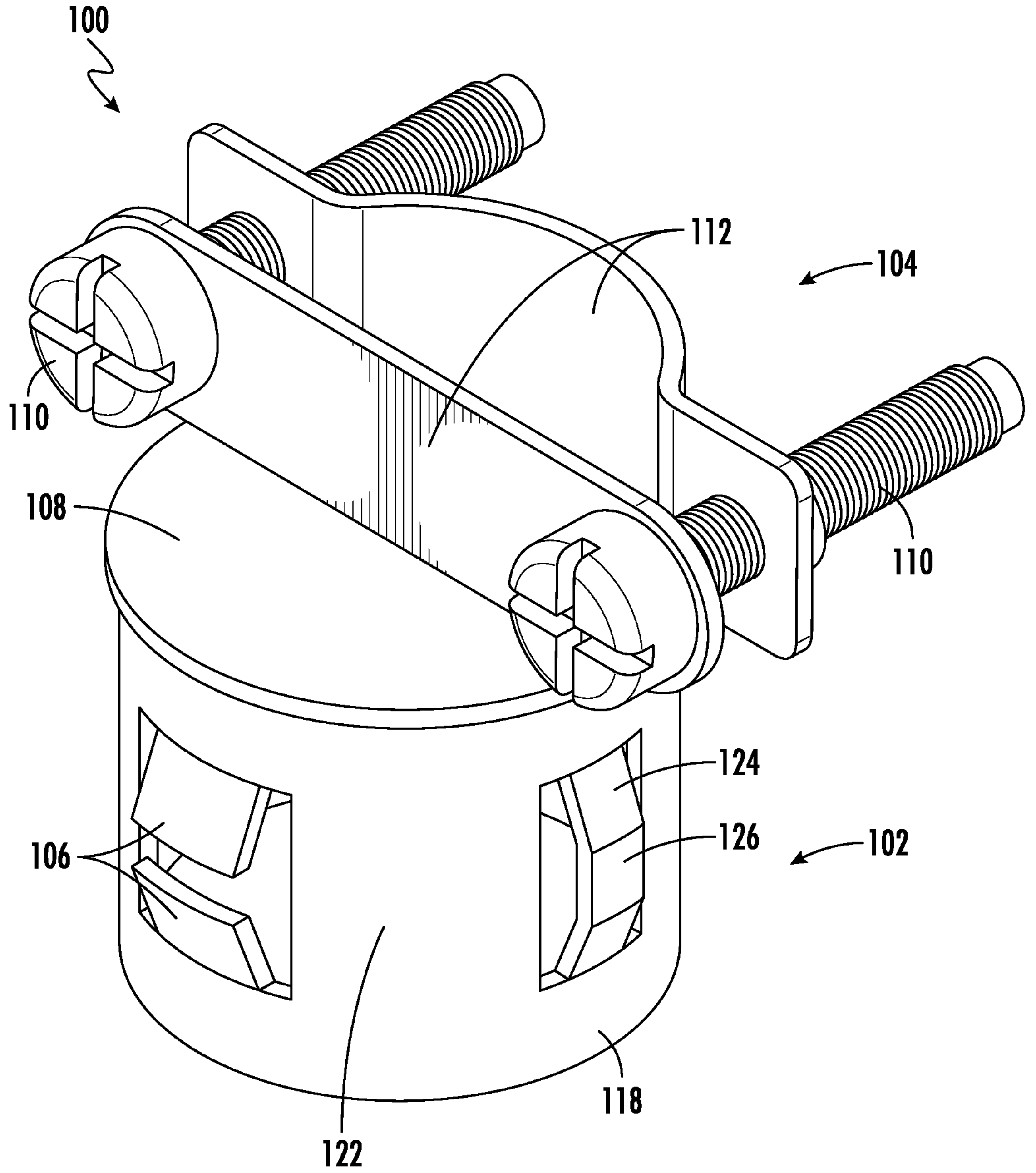
FIG. 1 is a right-side perspective view of a cable clamp.
Figure 2:
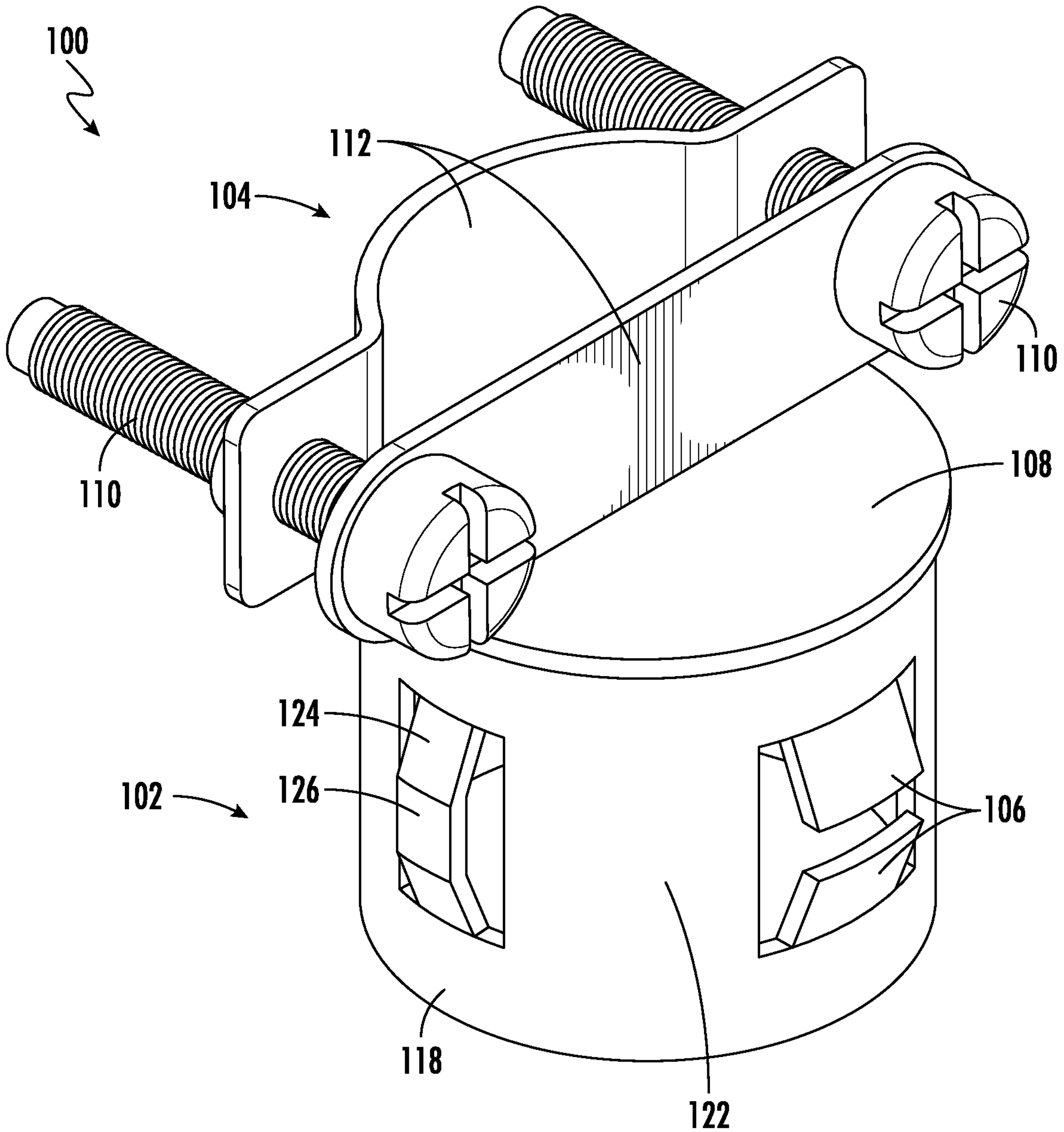
FIG. 2 is a left-side perspective view of the cable clamp shown in FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

Figure 3:
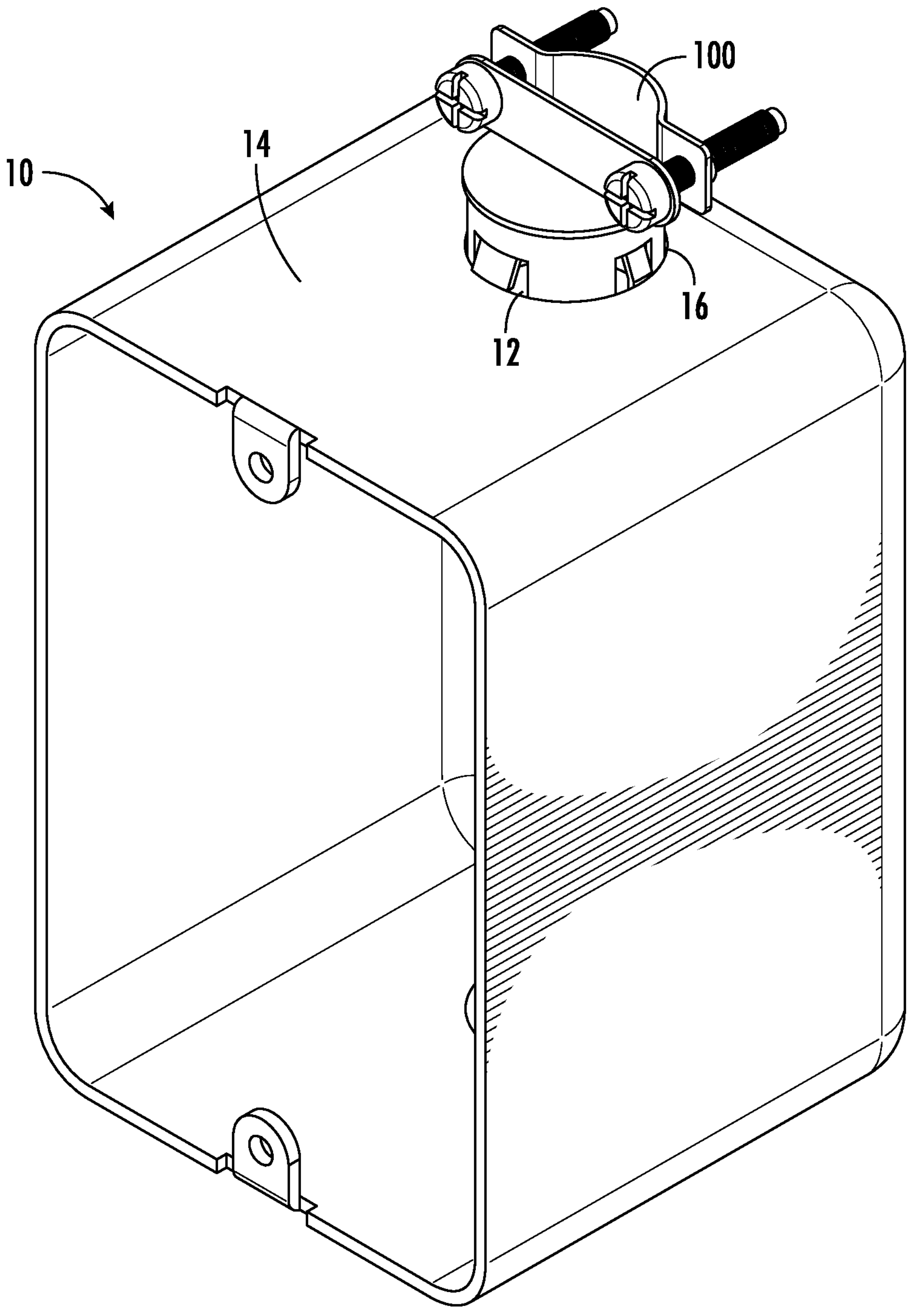
FIG. 3 is a perspective view of the cable clamp shown in FIG. 1 coupled with an electrical box.
Figure 4:
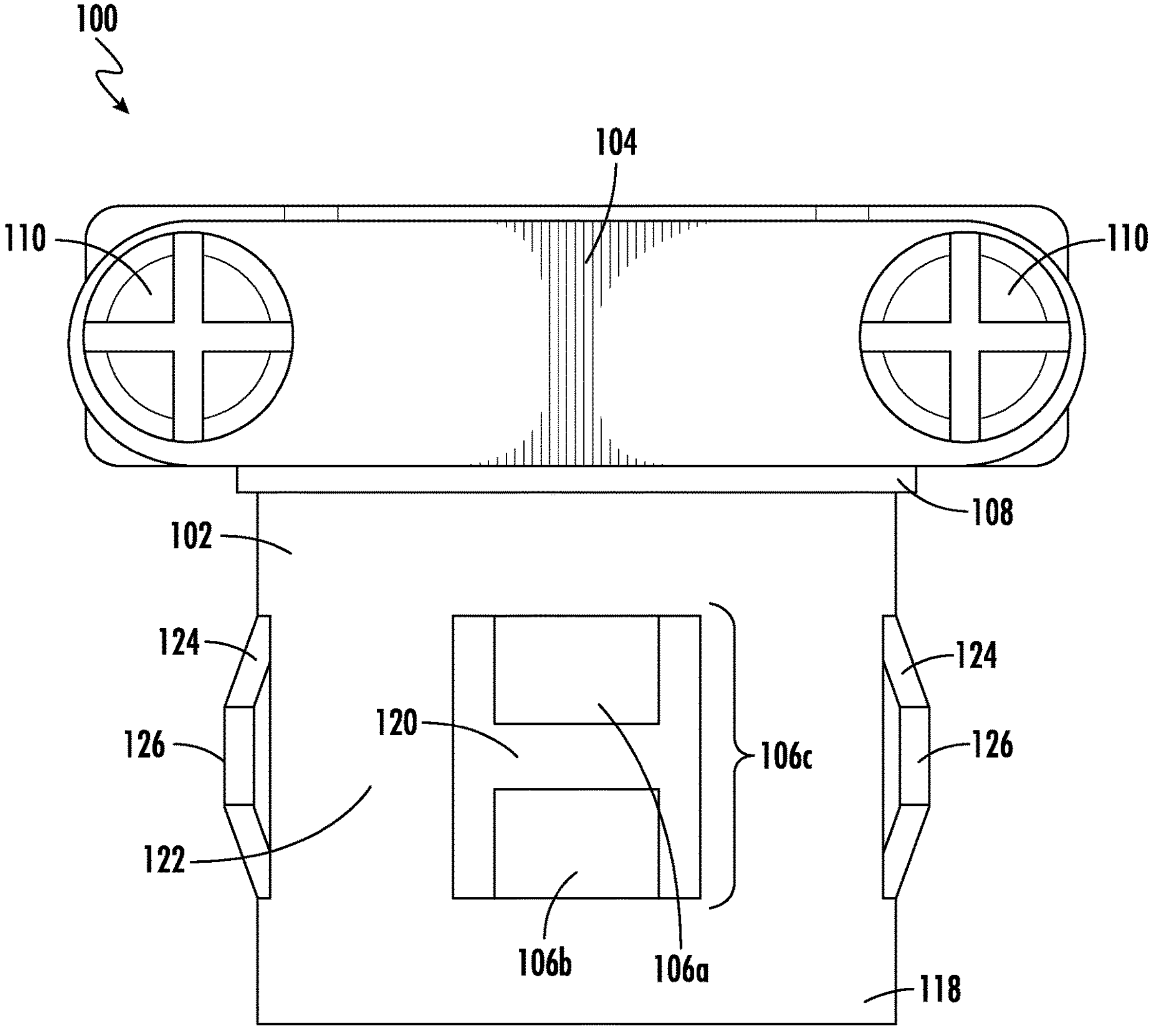
FIG. 4 is a front view of the cable clamp shown in FIG. 1.
Figure 5:
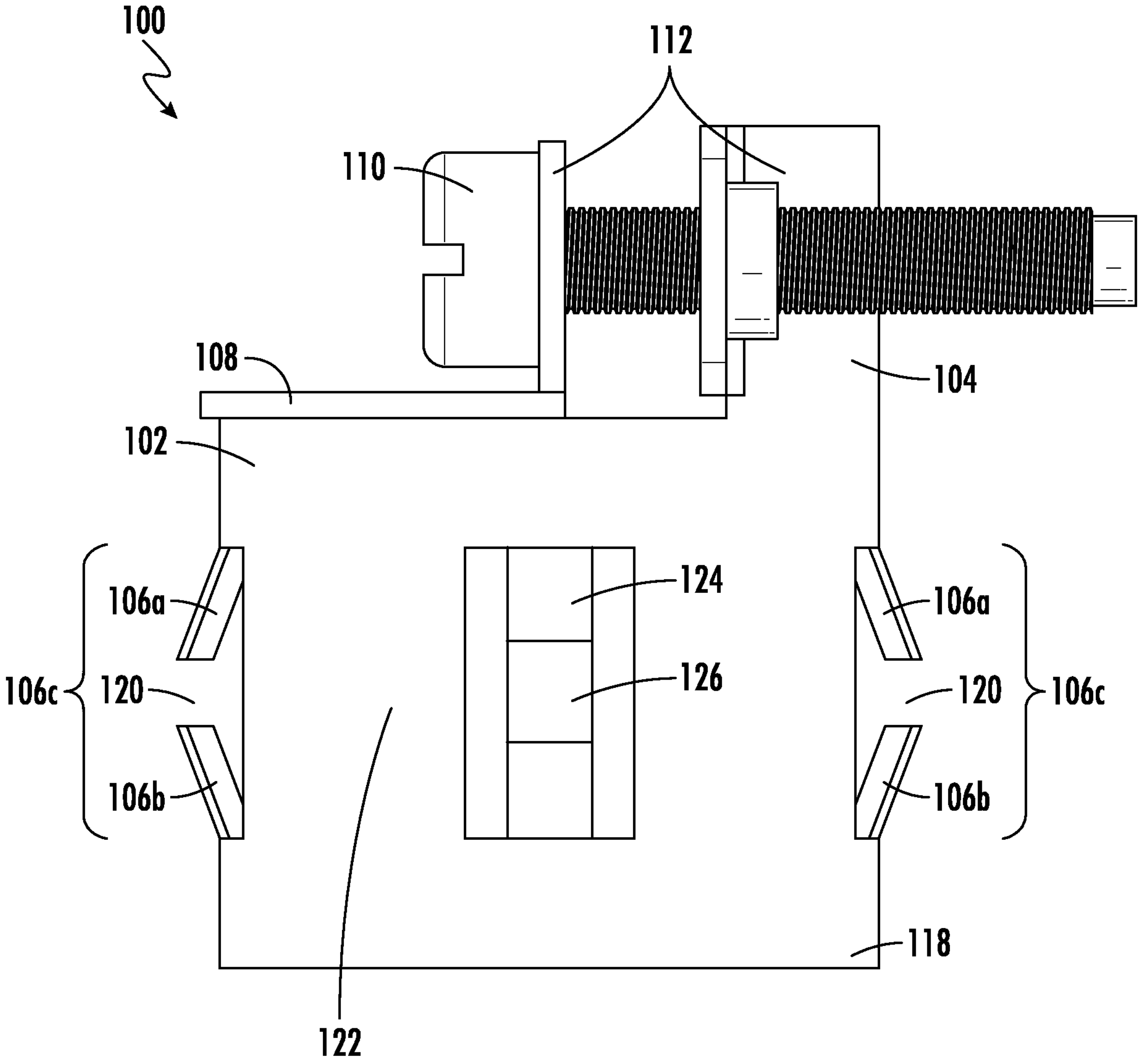
FIG. 5 is a right-side view of the cable clamp shown in FIG. 1.
Figure 6:
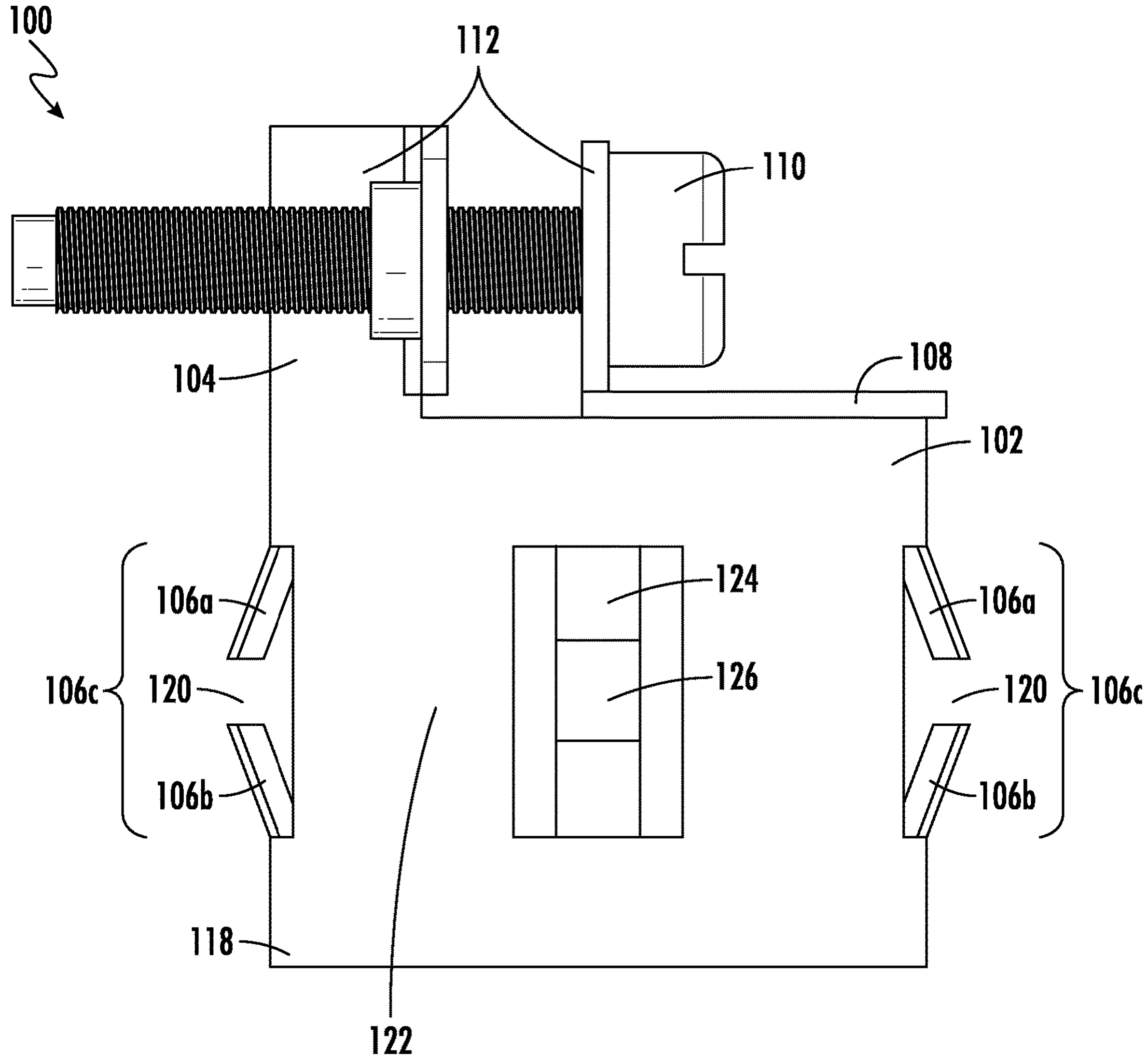
FIG. 6 is a left-side view of the cable clamp shown in FIG. 1.
Figure 7:
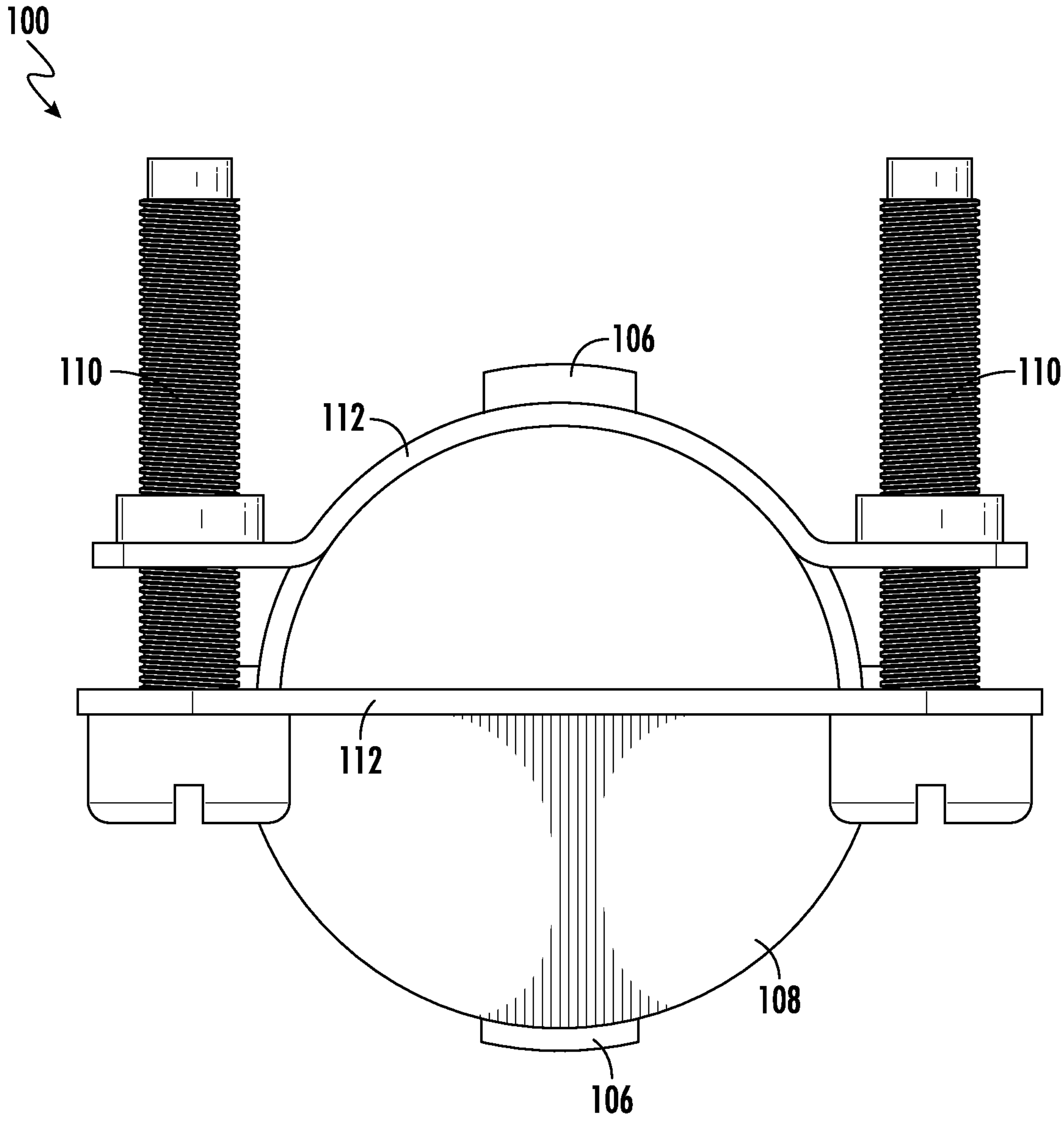
FIG. 7 is a top view of the cable clamp shown in FIG. 1.
Figure 8:
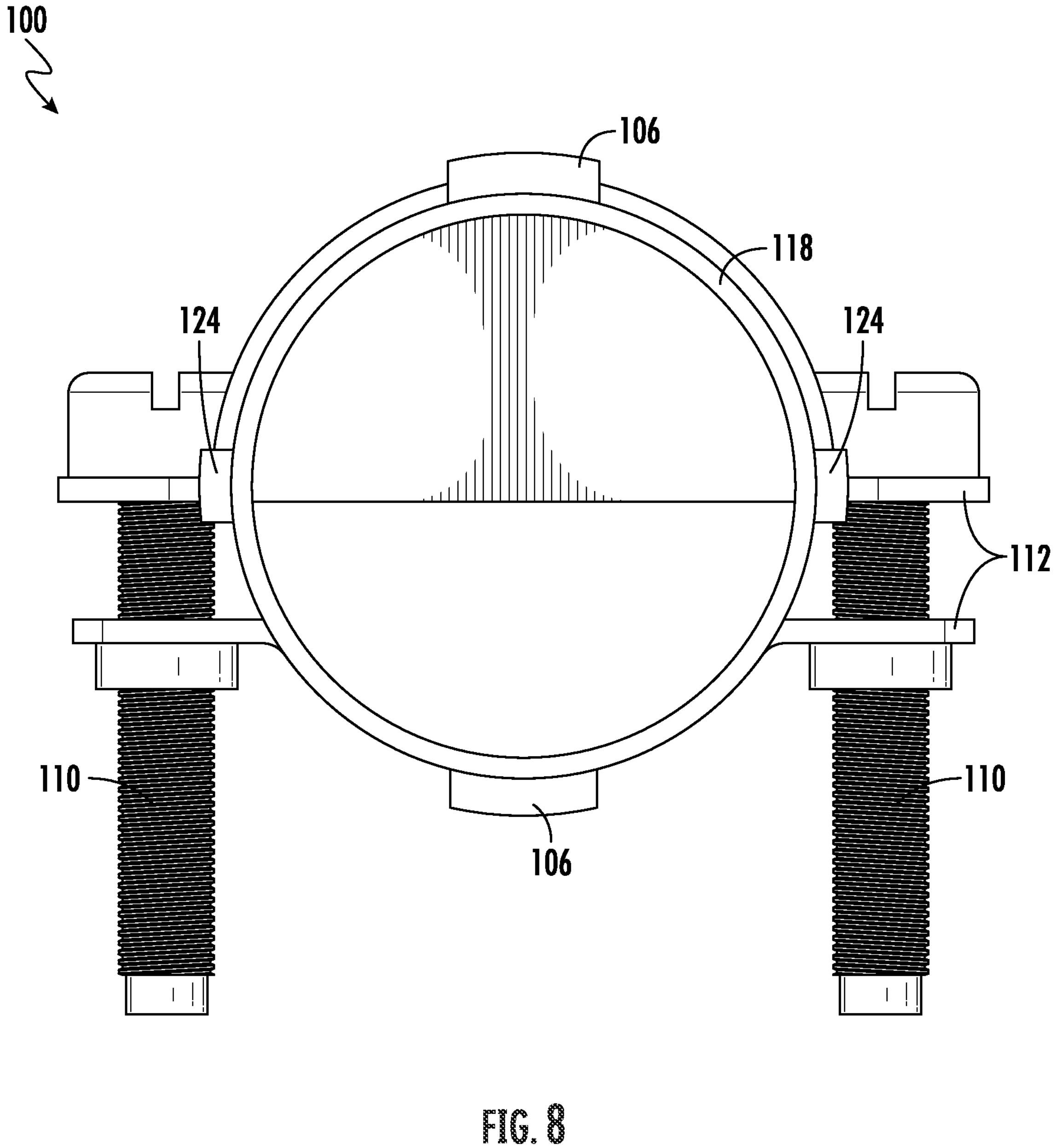
FIG. 8 is a bottom view of the cable clamp shown in FIG. 1.
Figure 9:
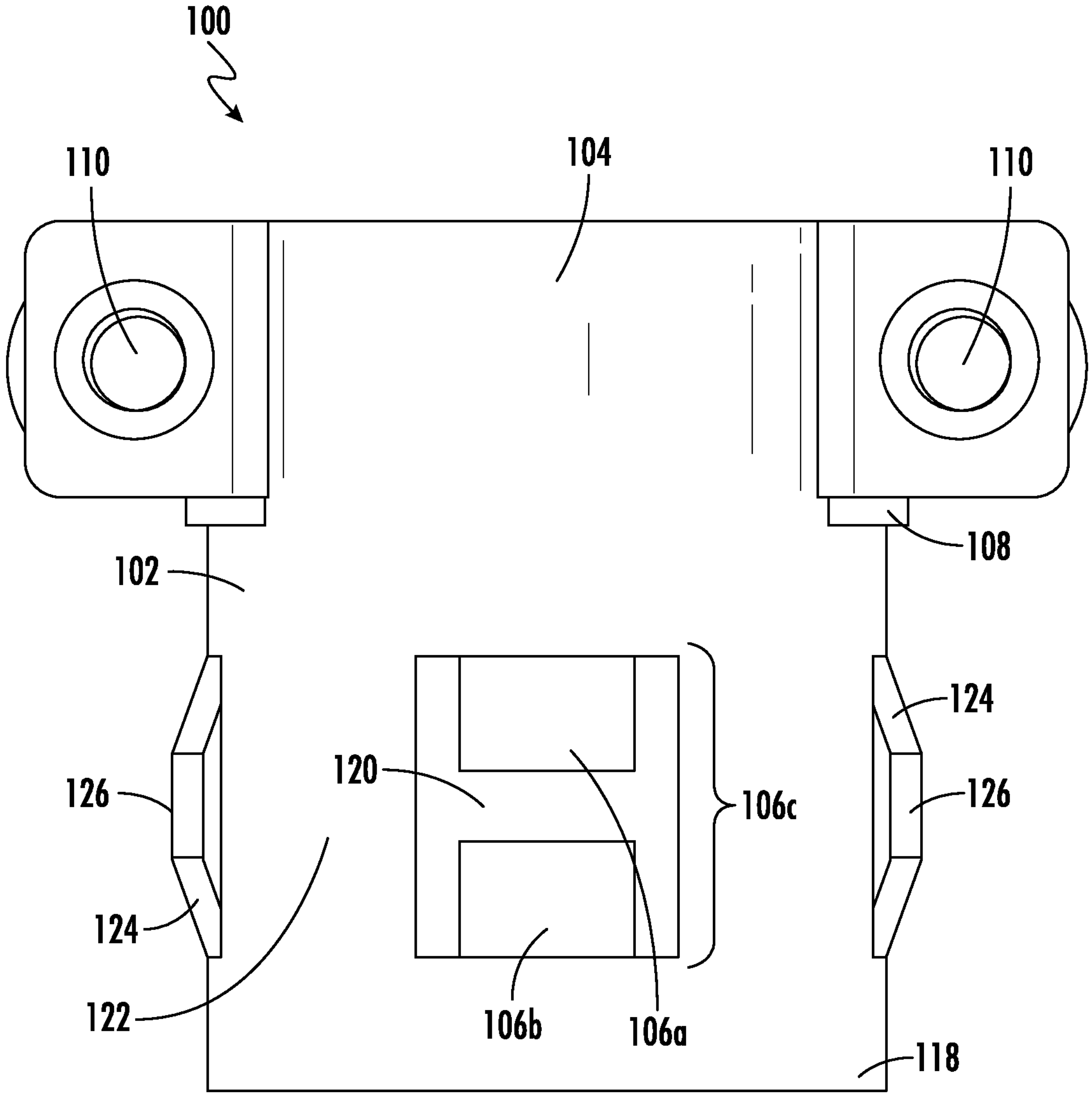
FIG. 9 is a back view of the cable clamp shown in FIG. 1.
Figure 10:
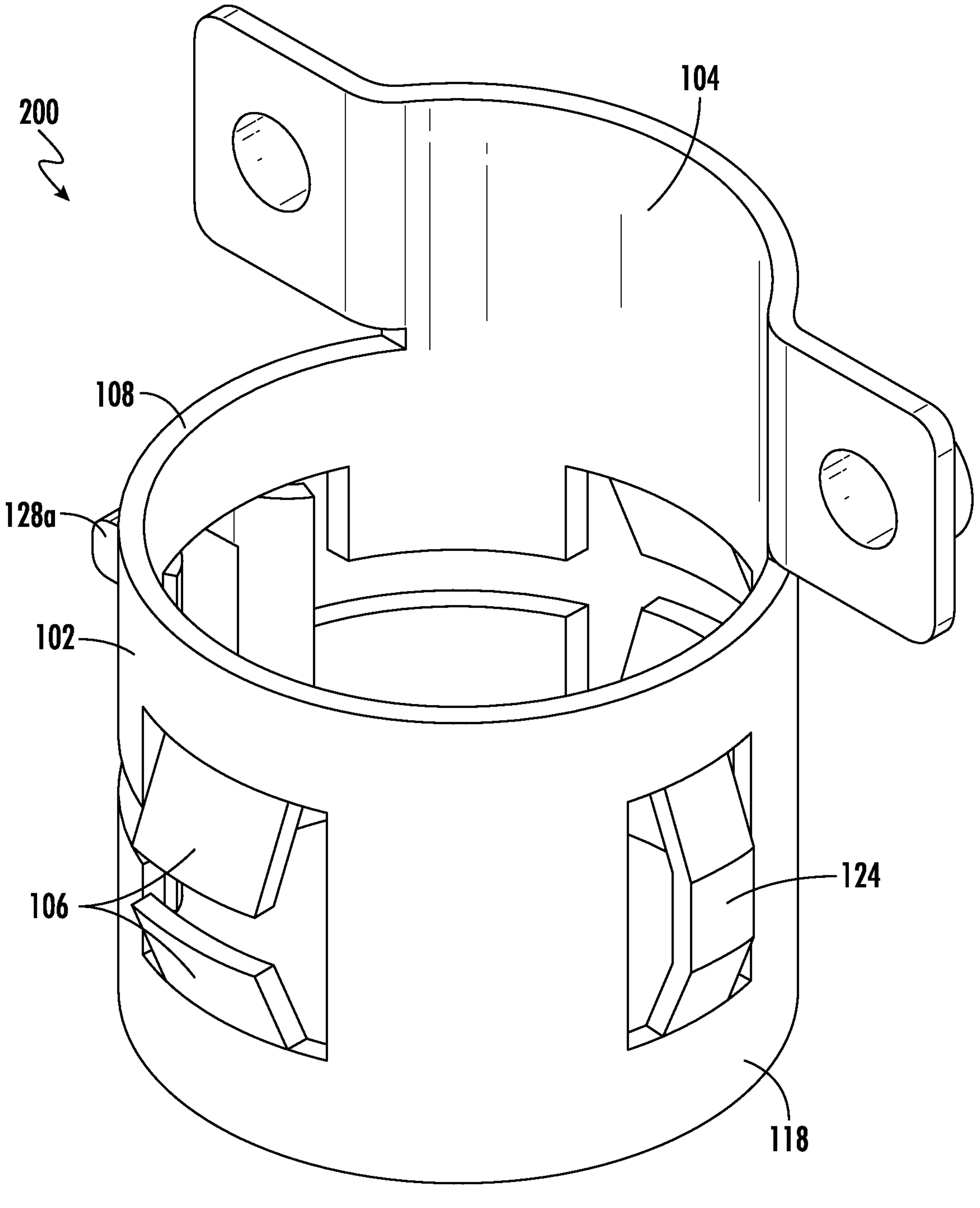
FIG. 10 is a right-side perspective view of a cable clamp with a release.
Figure 11:
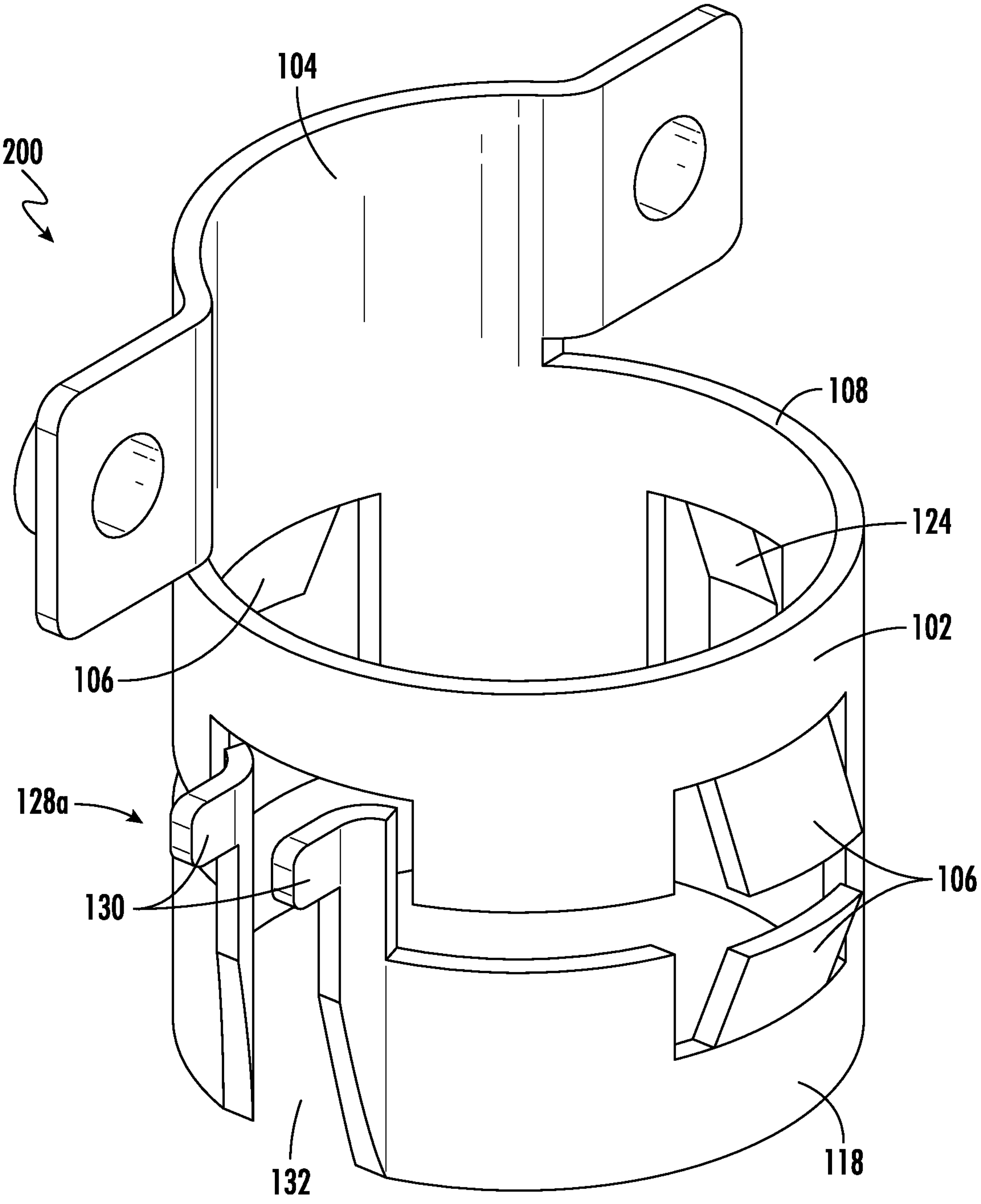
FIG. 11 is a left-side perspective view of the cable clamp shown in FIG. 10.
Figure 12:
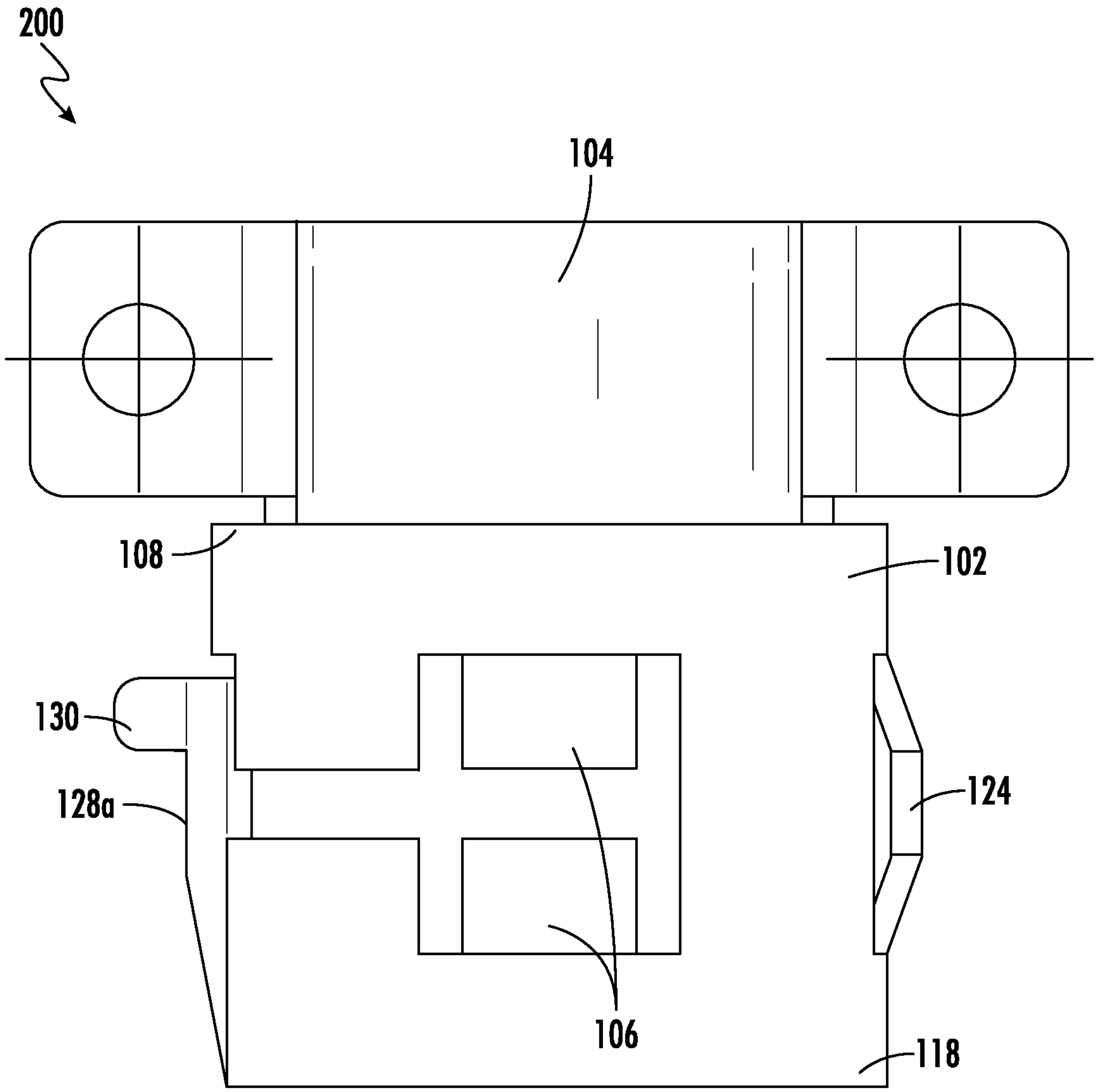
FIG. 12 is a front view of the cable clamp shown in FIG. 10.
Figure 13:
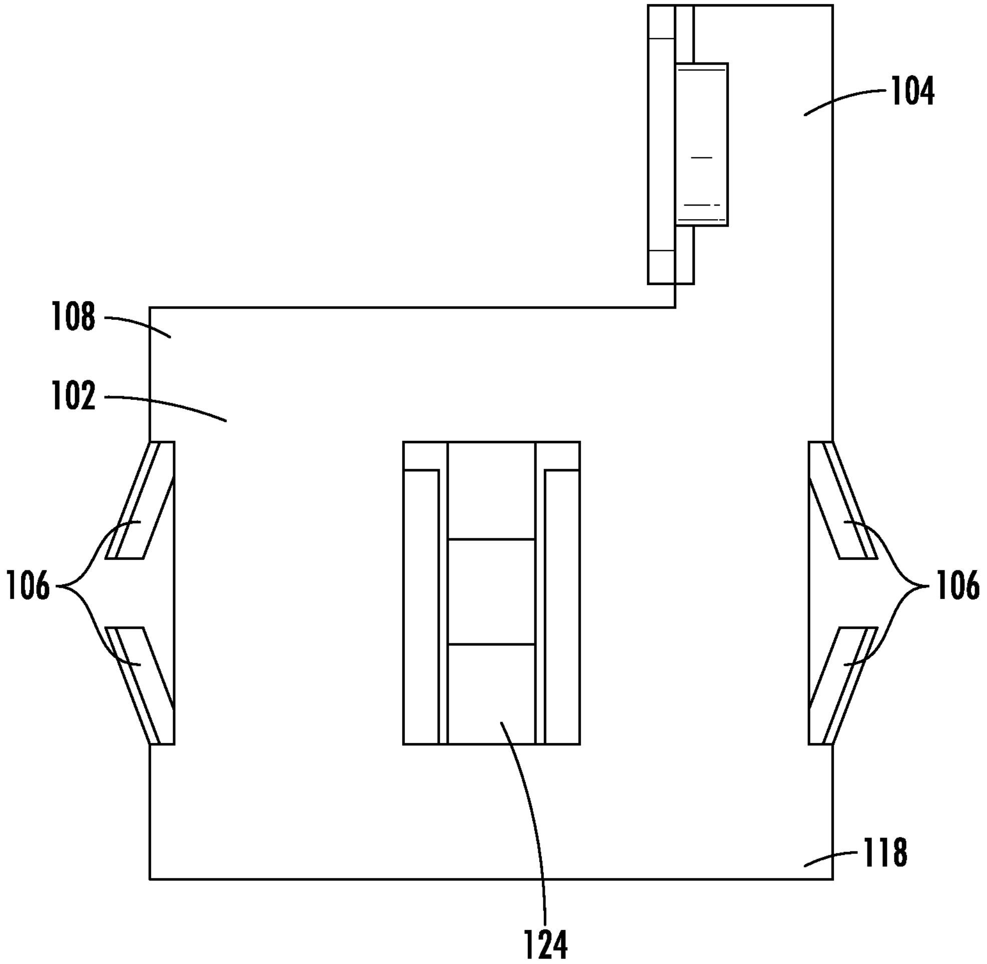
FIG. 13 is a side view of the cable clamp shown in FIG. 10.
Figure 14:
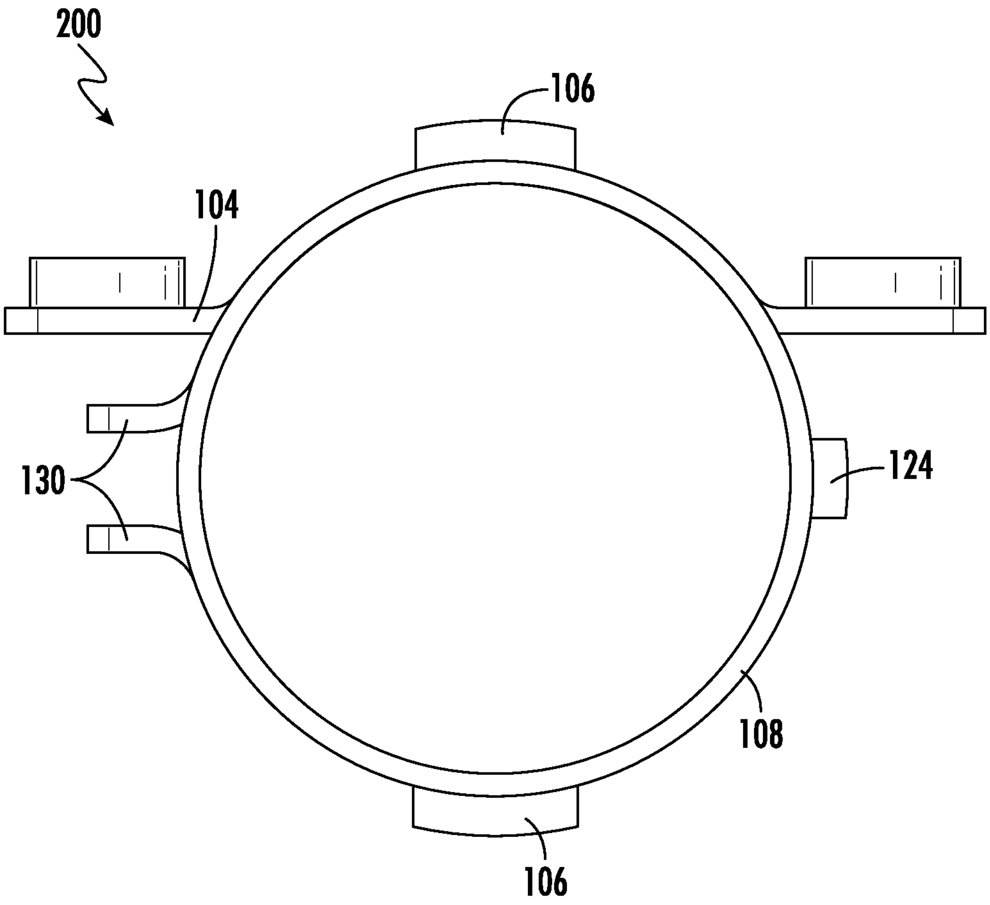
FIG. 14 is a top view of the cable clamp shown in FIG. 10.
Figure 15:
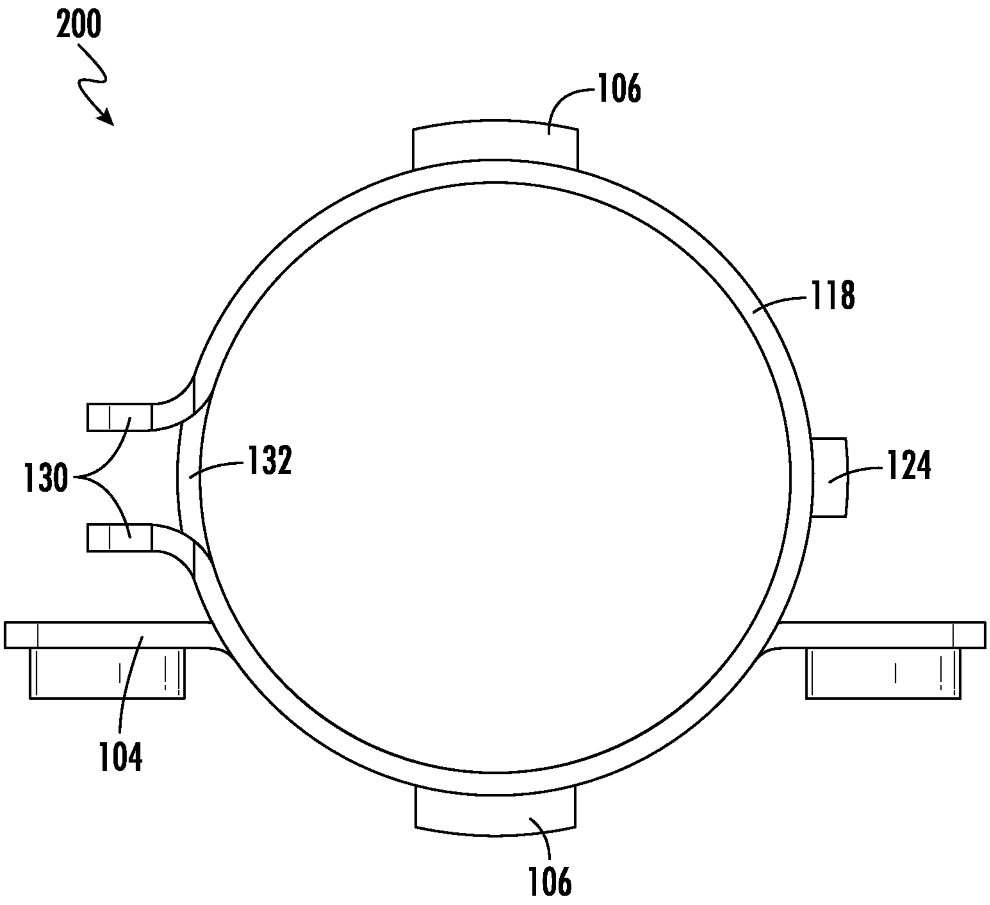
FIG. 15 is a bottom view of the cable clamp shown in FIG. 10.
Figure 16:
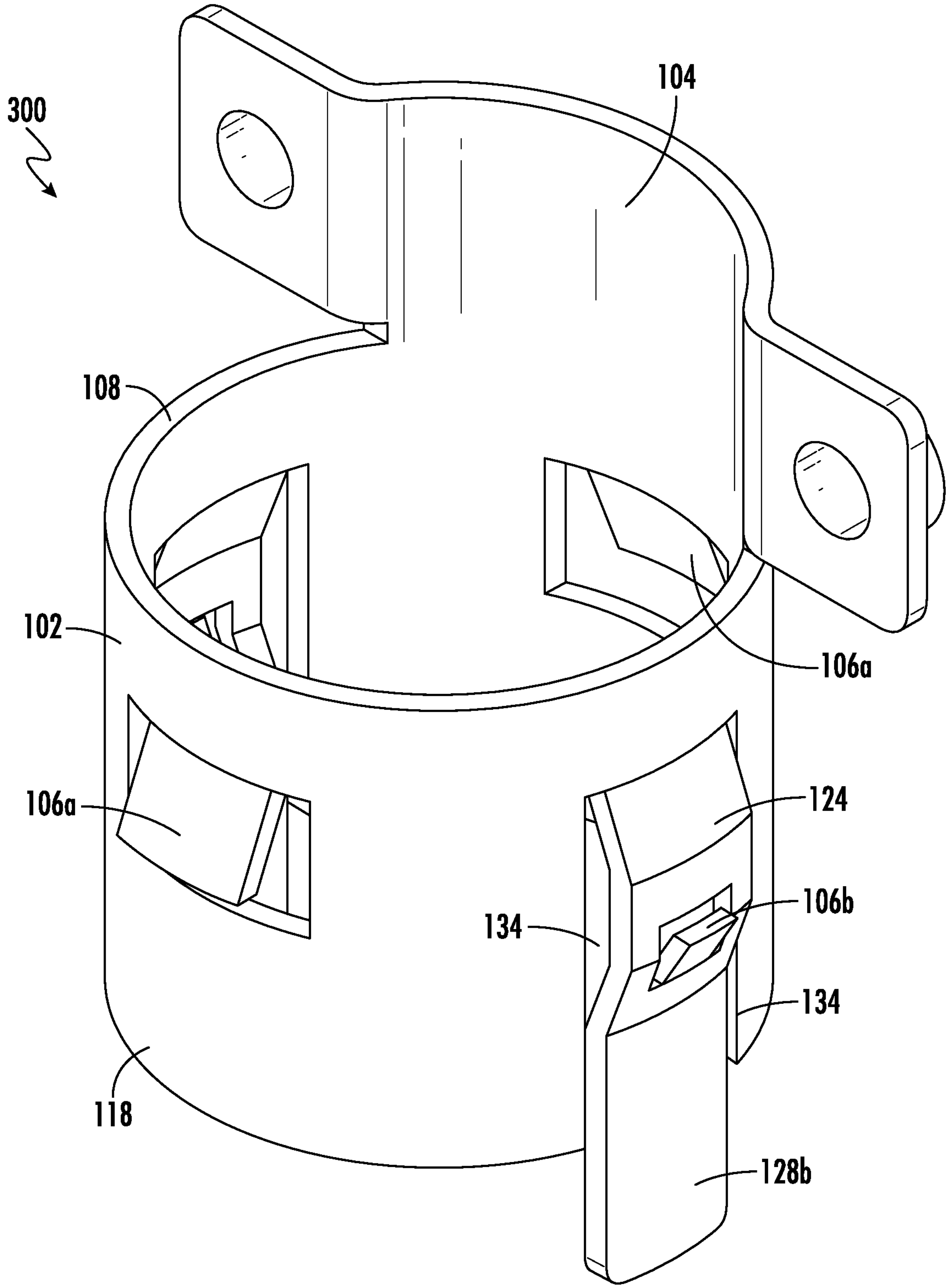
FIG. 16 is a right, top perspective view of another cable clamp with a release.
Figure 17:
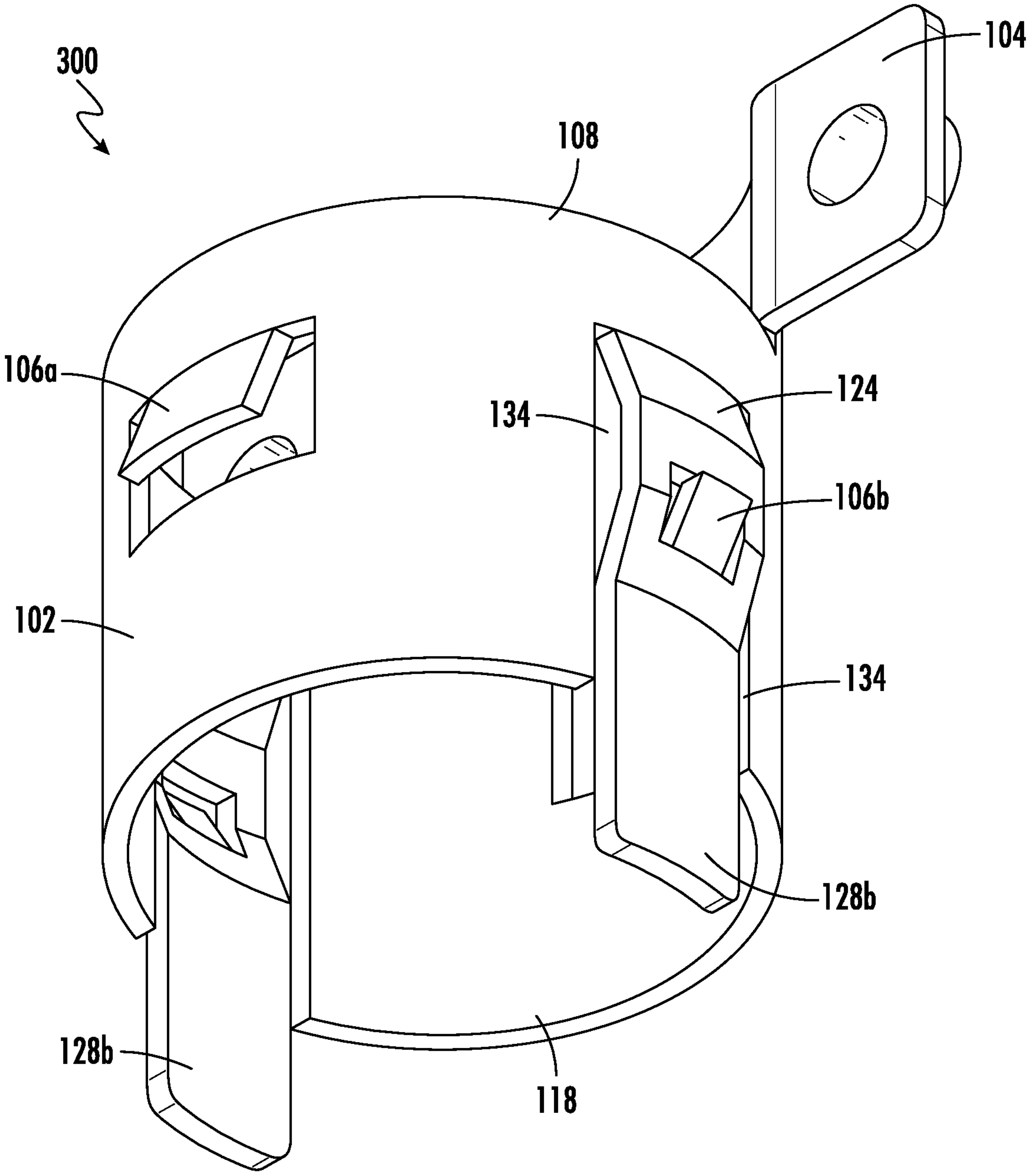
FIG. 17 is a right, bottom perspective view of the cable clamp shown in FIG. 16.
Figure 18:
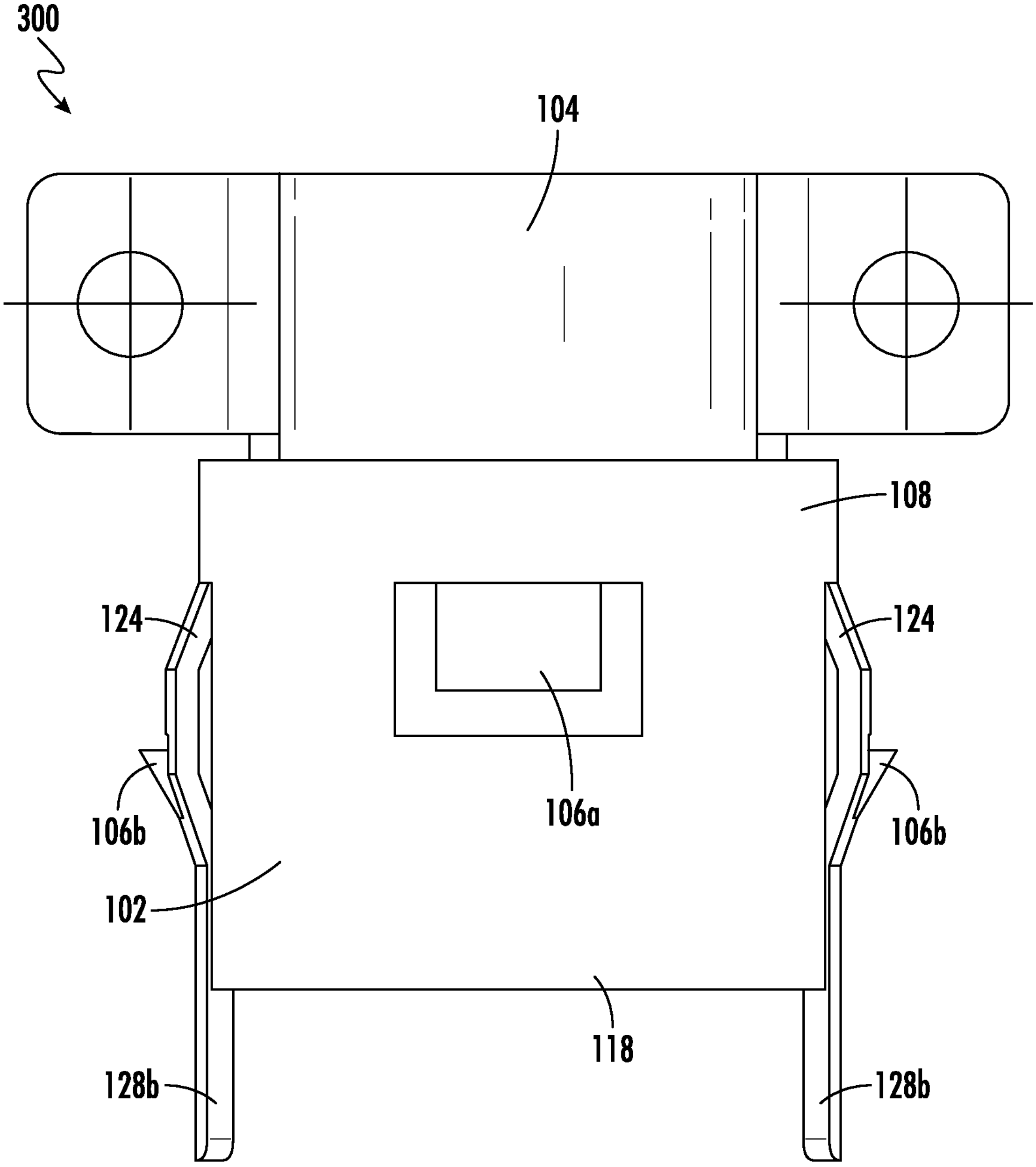
FIG. 18 is a front view of the cable clamp shown in FIG. 16.
Figure 19:
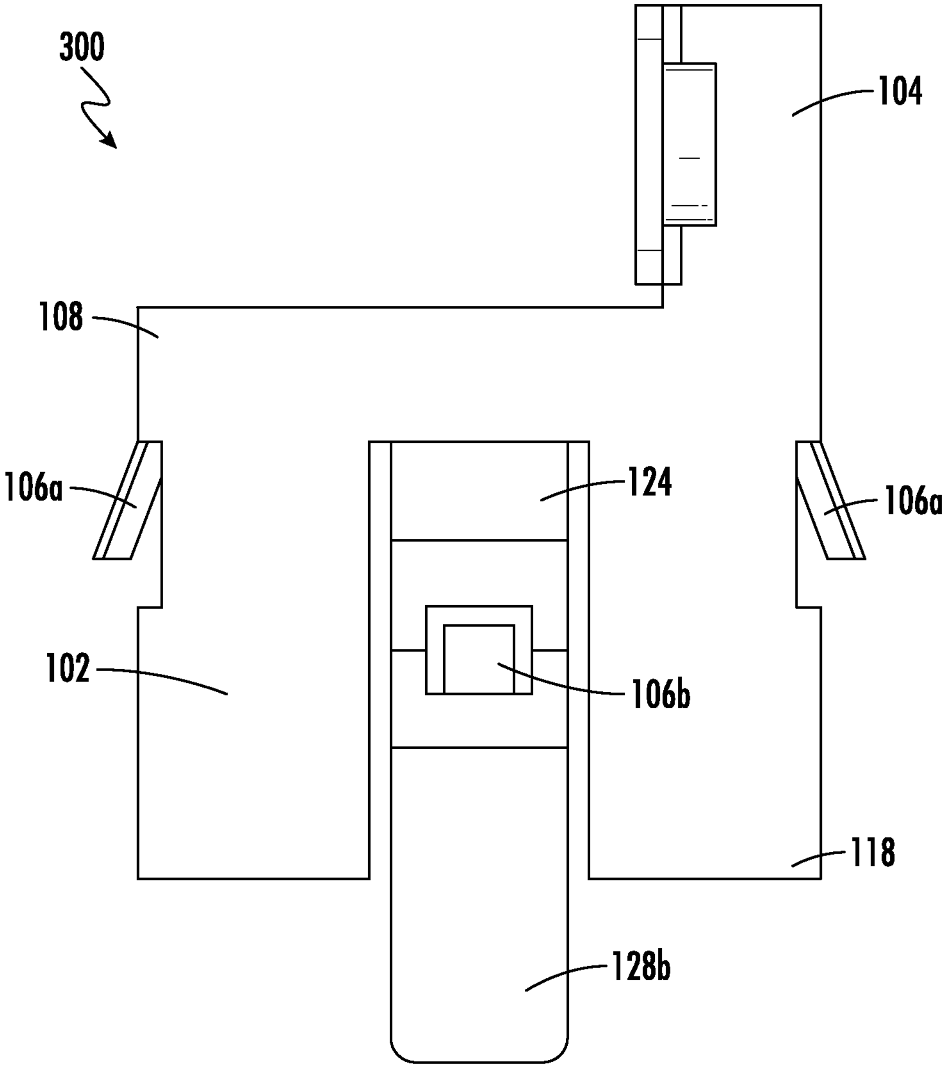
FIG. 19 is a side view of the cable clamp shown in FIG. 16.
Figure 20:
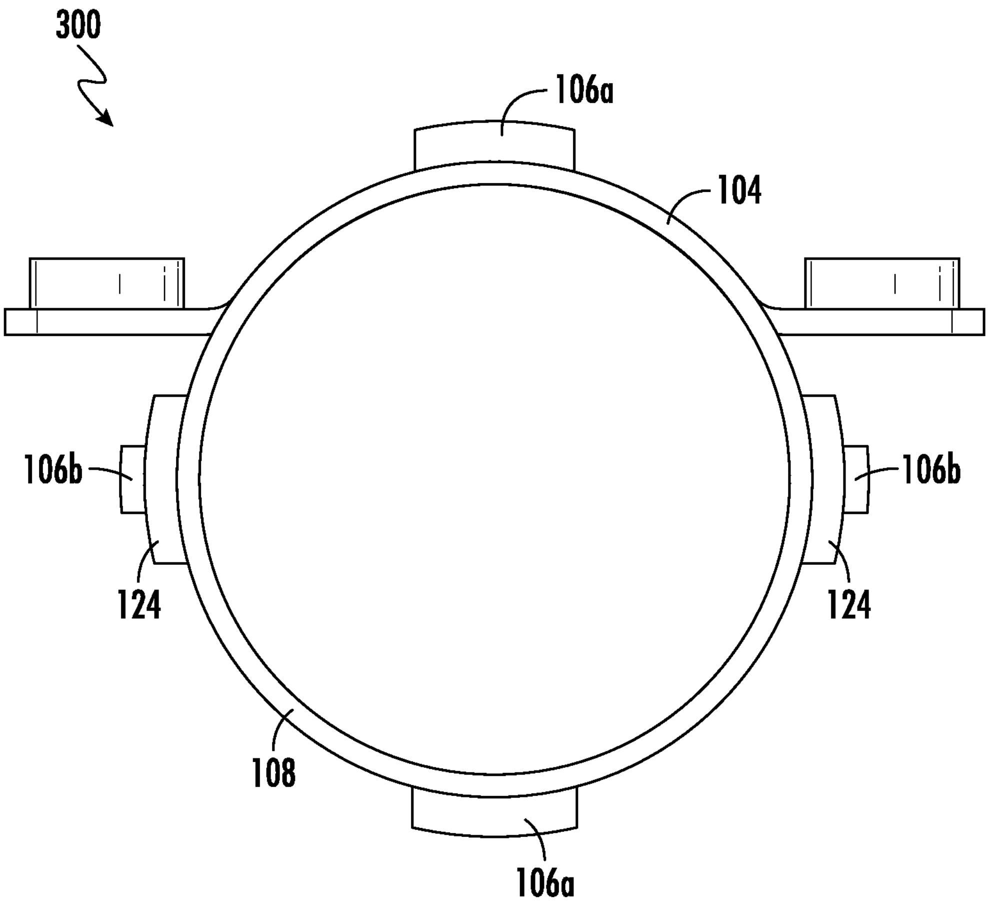
FIG. 20 is a top view of the cable clamp shown in FIG. 16.
Figure 21:
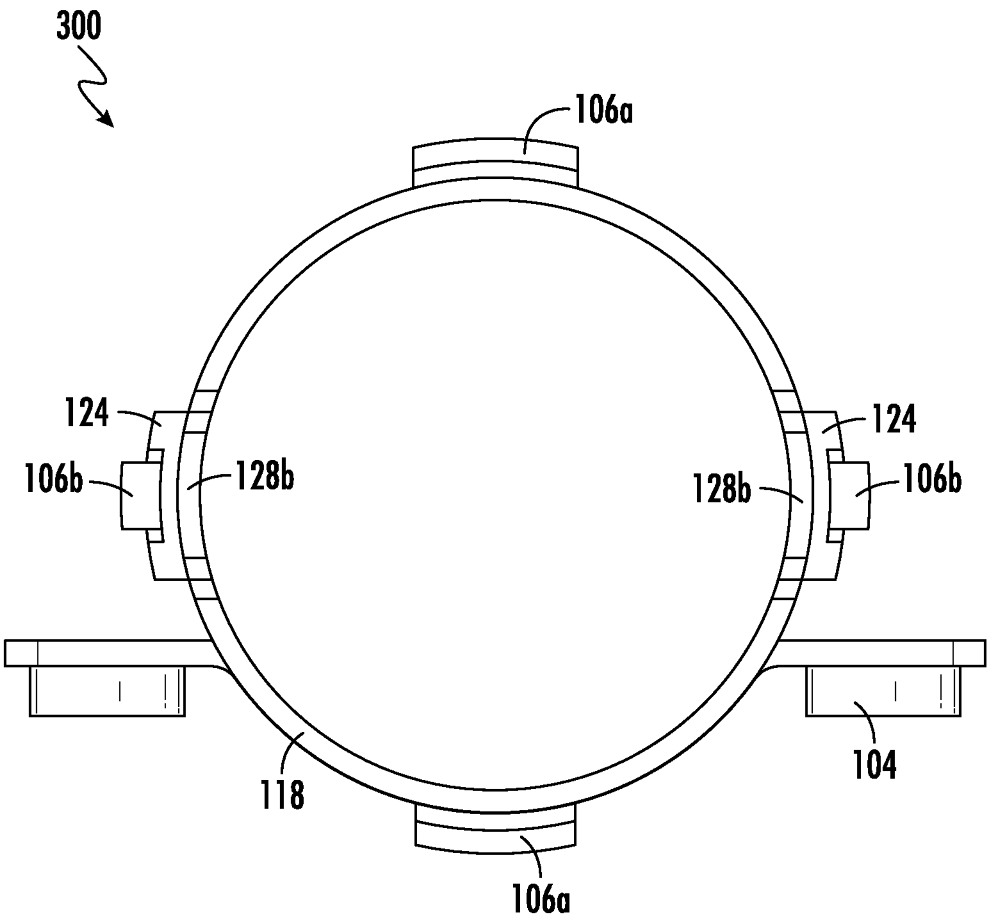
FIG. 21 is a bottom view of the cable clamp shown in FIG. 16.

The present disclosure is related to a snap-in cable clamp 100 for an electrical box 10. The cable clamp 100 is configured to enable easy installation and secure attachment to the electrical box 10. Additionally, the cable clamp 100 is configured to enable simpler removal of the cable clamp from the electrical box 10, as explained in more detail below. The cable clamp 100 comprises a main body 102, a clamp 104, and a plurality of clips 106, as shown in FIGS. 1-9. The main body 102 is hollow and is configured to provide a pathway for an electrical cable (not shown) through a wall opening 12 in a wall 14 of the electrical box 10, as shown in FIG. 3. Thus, the main body 102 is sized to fit within the wall opening 12. Once the electrical cable has been passed through the cable clamp 100 into the electrical box 10, the cable clamp 100 can be tightened to clamp or grip the electrical cable. This secures the electrical cable in place and decreases the chance that the electrical cable will get tugged on and removed from the electrical box 10. Thus, it is important for the cable clamp 100 to have a secure connection with the electrical box 10 because if the cable clamp 100 disconnects from the electrical box 10, the electrical cable is no longer secured in place.

The clamp 104 is positioned on a top end 108 of the main body 102 and is still accessible outside of the electrical box 10 after the cable clamp 100 has been installed in the electrical box 10. This allows the clamp 104 to be tightened onto the electrical cable as explained above. The clamp 104 may have at least one screw 110 that, when rotated, is configured to move two plates 112 towards or away from each other. In this way, when the electrical cable extends through the clamp 104, the screw 110 can be rotated to move the plates 112 closer together and clamp the two plates 112 around the electrical cable. Thus, the screw 110 is configured to tighten the clamp 104 to grip the electrical cable.

The clips 106 are configured to allow the cable clamp 100 to insert into and snap onto the wall opening 12 of the wall 14 of the electrical box 10. For example, the clips 106 may extend away from the main body 102 at an angle such that the cable clamp 100 is sized larger than the wall opening 12 at the clips 106. The clips 106 may be configured to elastically deform as the cable clamp 100 is inserted into the wall opening 12, thus allowing the cable clamp 100 to be inserted, and then snapping back to their original configuration once the wall 14 of the electrical box 10 passes the clips 106. This helps to secure the cable clamp 100 within the wall opening 12. In this way, the clips 106 are configured to hold the cable clamp 100 to an edge 16 of the wall opening 12 of the electrical box 10.

The clips 106 may originate from the main body 102 of the cable clamp 100. This is different from a conventional cable clamp that has a metal ring that wraps around the body of the clamp. Instead, the clips 106 directly originate from the main body 102 and extend away from the main body 102. In other words, in some embodiments, the main body 102 and the clips 106 are manufactured or formed together as a single piece and are integral to each other. This makes the location of the clips 106 more predictable because they are fixed in position with respect to the main body 102. Thus, even if the clips 106 are no longer visible after the cable clamp 100 has been inserted into electrical box 10, the user can still locate the clips 106 more easily.

The clips 106 may be divisible into a first portion of clips **106*a* and a second portion of clips 106*b*. Each clip 106*a* of the first portion of clips 106*a* is oriented in a downward direction such that as each clip 106*a* of the first portion of clips 106*a* extends away from the main body 102, the clip 106*a* also extends away from the top end 108 of the main body 102. On the other hand, each clip 106*b* of the second portion of clips 106*b* is oriented in an upward direction opposite the downward direction such that as each clip 106*b* of the second portion of clips 106*b* extends away from the main body 102, the clip 106*b* also extends towards the top end 108 of the main body 102. Thus, when the cable clamp 100 is inserted into the wall opening 12 with a bottom end 118 of the main body 102 first, where the bottom end 118 is opposite the top end 108, the clips 106*b* of the second portion of clips 106*b* are elastically deformed until the clips 106*b* of the second portion of clips 106*b* pass the wall 14, enter the electrical box 10, and snap back to their original configuration as described above. The clips 106*a* of the first portion of clips 106*a*, on the other hand, are not deformed when the cable clamp 100 is inserted into the wall opening 12 with the bottom end 118 first. Instead, in such a situation, the clips 106*a* of the first portion of clips 106*a* act to limit movement between the cable clamp 100 and the electrical box 10**.

In some embodiments, the clips **106*b* of the second portion of clips 106*b* and the clips 106*a* of the first portion of clips 106*a* are separated by a gap 120 that is sized to be similar to a thickness of the wall 14 of the electrical box 10. Thus, once the cable clamp 100 is inserted into the wall opening 12, the clips 106*a* of the first portion of clips 106*a* and the clips 106*b* of the second portion of clips 106*b* hold the cable clamp 100 securely to an edge 16 of the wall opening 12 of the electrical box 10, without allowing a large amount of movement between the cable clamp 100 and the electrical box 10. In some embodiments, the clips 106*b* of the second portion of clips 106*b* and the clips 106*a* of the first portion of clips 106*a* are configured to position the wall 14 of the electrical box 10 at a midsection 122 of the main body 102**.

Each clip **106*a* of the first portion of clips 106*a* may be vertically aligned with a corresponding clip 106*b* of the second portion of the clips 106*b* to form of pair of clips 106*c*. Each pair of clips 106*c* is configured to snap onto and hold the cable clamp 100 to the edge 16 of the wall opening 12 of the electrical box 10 as described above. In some embodiments, the cable clamp 100 has two pairs of clips 106*c* positioned on opposing sides of the main body 102. In some embodiments, the pair of clips 106*c* may also be misaligned such that the clips 106 alternate between a clip 106*b* of the second portion of the clips 106*b* and a clip 106*a* of the first portion of clips 106*a* around a circumference of the main body 102, as shown in FIGS. 16-21**.

The cable clamp 100 may also comprise a plurality of spacers 124 that are configured to wedge the main body 102 within the wall opening 12. The spacers 124 help to keep the cable clamp 100 centered within the wall opening 12. Similar to the clips 106, the spacers 124 originate from the main body 102 and extend away from the main body 102. In other words, in some embodiments, the main body 102 and the spacers 124 are manufactured or formed together as a single piece and are integral to each other. Though, in some embodiments, the clips 106 and the spacers 124 both originate from the main body 102, the spacers 124 are separate and distinct from the clips 106. Different from the clips 106, the spacers 124 are configured to extend away from the main body 102, but then curve back and rejoin with the main body 102. Thus, the spacers 124 form a raised rib on the main body 102. A peak 126 of the rib may be positioned on the main body 102 to align with the gap 120 between the clips **106*b* of the second portion of clips 106*b* and the clips 106*a* of the first portion of clips 106*a*. This alignment helps to center the main body 102 within the wall opening 12 when the clips 106 are snapped onto and holding the cable clamp 100 to the edge 16 of the wall opening 12. In embodiments where the clips 106 are configured to position the wall 14 of the electrical box 10 at a midsection 122 of the main body 102, the peaks 126 of the spacers 124 may also be positioned at the midsection 122 of the main body 102. In some embodiments, the cable clamp 100 comprises two spacers 124 on opposing sides of the main body 102**.

Additional embodiments of the cable clamp 200, 300 are illustrated in FIGS. 11-21. The cable clamp 200, 300 may have any of the features described above with reference to cable clamp 100. Additionally, cable clamp 200, 300 may also comprise a release arm **128*a*, 128*b* integrated into the main body 102. The release arm 128*a*, 128*b* facilitates removal of the cable clamp 200, 300 from the wall opening 12. The release arm 128*a*, 128*b* is configured to control a radial position of the clips 106*b* of the second portion of clips 106*b*. In other words, the release arm 128*a*, 128*b* is configured to move the clips 106*b* of the second portion of clips 106*b* closer to or further away from the center axis of the main body 102. This allows the user to use the release arm 128*a*, 128*b* to release the edge 16 of the wall opening 12 from being held by the second portion of clips 106*b* by moving the second portion of clips 106*b* radially inward past the edge 16 of the wall opening 12. The release arm 128*a*, 128*b* may be any shape and any configuration, and multiple release arms 128*a*, 128*b* may be incorporated into a single cable clamp 100**.

FIGS. 11-15 illustrate the cable clamp 200 with a release arm **128*a*. As shown, the release arm 128*a* has two tabs 130 extending radially outward from the main body 102 on opposite sides of a slot 132 in the main body 102 extending up from the bottom end 118. The slot 132 provides the flexibility needed for the clips 106*b* to move and the tabs 130 provide the leverage. When a user presses the two tabs 130 together, this slot 132 becomes smaller and the slips 106*b* move radially inward to allow the clips 106*b* to release the edge 16 of the wall opening 12**.

FIGS. 16-21 illustrate the cable clamp 300 with a release arm **128*b*. As shown, the release arm 128*b* extends down from the bottom end 118 of the main body 102 below a clip 106*b*. A cut 134 may separate the clip 106*b* from the main body 102 on either side of the clip 106*b*. Thus, when the release arm 128*b* is pushed radially inward, the clip 106*b* moves with the release arm 128*b* to allow the clip 106*b* to release the edge 16 of the wall opening 12. In some embodiments of the cable clamp 100, each clip 106*b* has a corresponding release arm 128*b*. Additionally, in some embodiments, each clip 106*b* is positioned on a spacer 124, while each clip 106*a* is positioned directly on the main body 102, as shown in FIGS. 16-21**.

It will be understood that implementations of a cable clamp are not limited to the specific assemblies, devices and components disclosed in this document, as virtually any assemblies, devices and components consistent with the intended operation of a cable clamp may be used. Accordingly, for example, although particular cable clamps, and other assemblies, devices and components are disclosed, such may include any shape, size, style, type, model, version, class, measurement, concentration, material, weight, quantity, and/or the like consistent with the intended operation of cable clamps. Implementations are not limited to uses of any specific assemblies, devices and components; provided that the assemblies, devices and components selected are consistent with the intended operation of a cable clamp.

Accordingly, the components defining any cable clamp may be formed of any of many different types of materials or combinations thereof that can readily be formed into shaped objects provided that the materials selected are consistent with the intended operation of a cable clamp. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various cable clamps may be manufactured using conventional procedures as added to and improved upon through the procedures described here. Some components defining a cable clamp may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling cable clamps are not limited to the specific order of steps as disclosed in this document. Any steps or sequence of steps of the assembly of a cable clamp indicated herein are given as examples of possible steps or sequence of steps and not as limitations, since various assembly processes and sequences of steps may be used to assemble cable clamps.

The implementations of a cable clamp described are by way of example or explanation and not by way of limitation. Rather, any description relating to the foregoing is for the exemplary purposes of this disclosure, and implementations may also be used with similar results for a variety of other applications employing a cable clamp.

What is claimed is:

1. A snap-in electrical box cable clamp comprising:

a one-piece, hollow, cylindrical main body configured to provide a pathway for an electrical cable through a wall opening in a wall of an electrical box, wherein the cylindrical main body has a continuous, uninterrupted circumferential wall at the top end of the main body;

a clamp positioned on a top end of the main body, the clamp having at least one screw, wherein the electrical cable passes through the clamp when the electrical cable extends along the pathway through the main body and wherein the at least one screw is configured to tighten the clamp to grip the electrical cable;

a plurality of clips formed in a one-piece formation with the main body, originating from the main body and extending away from the main body, wherein each clip of a first portion of the plurality of clips is oriented in a downward direction and each clip of a second portion of the plurality of clips is oriented in an upward direction opposite the downward direction, wherein each clip of the first portion of the plurality of clips is vertically aligned with a corresponding clip of the second portion of the plurality of clips to form a pair of clips with a midsection of the main body positioned between each pair of clips, wherein each pair of clips is configured to snap onto and hold the cable clamp to an edge of the wall opening of the electrical box at the midsection of the main body; and a plurality of spacers formed in a one-piece formation with the main body, originating from the main body and extending away from the main body separate from the plurality of clips, the plurality of spacers positioned at the midsection of the main body and configured to wedge the main body within the wall opening with the wall opening centered about the midsection of the main body.

2. The snap-in electrical box cable clamp of claim 1, wherein the plurality of clips comprises two pairs of clips on opposing sides of the main body.

3. The snap-in electrical box cable clamp of claim 1, wherein the plurality of spacers comprises two spacers on opposing sides of the main body.

4. The snap-in electrical box cable clamp of claim 1, further comprising a release arm integrated into the main body and configured to control a radial position of at least the second portion of at least one clip of the plurality of clips to selectively release the edge of the wall opening from being held by the second portion of the at least one clip of the plurality of clips.

5. A snap-in electrical box cable clamp comprising:

a one-piece, hollow, cylindrical main body configured to provide a pathway for an electrical cable through a wall opening in a wall of an electrical box, wherein the main body has a continuous, uninterrupted circumferential wall at the top end of the main body;

a clamp positioned on a top end of the main body, the clamp having at least one screw, wherein the electrical cable passes through the clamp when the electrical cable extends along the pathway through the main body and wherein the at least one screw is configured to tighten the clamp to grip the electrical cable; and a plurality of clips formed integral with and extending away from the main body, wherein each clip of a first portion of the plurality of clips is oriented in a downward direction and each clip of a second portion of the plurality of clips is oriented in an upward direction opposite the downward direction with a midsection of the main body positioned between each pair of clips, wherein the plurality of clips is configured to snap onto and hold the cable clamp to an edge of the wall opening of the electrical box at the midsection of the main body.

6. The snap-in electrical box cable clamp of claim 5, wherein the plurality of clips originate from and are each integral with the main body.

7. The snap-in electrical box cable clamp of claim 5, wherein each clip of the first portion of the plurality of clips is vertically aligned with a corresponding clip of the second portion of the plurality of clips to form a pair of clips, and wherein each pair of clips is configured to snap onto and hold the clamp to an edge of the wall opening of the electrical box.

8. The snap-in electrical box cable clamp of claim 5, further comprising a plurality of spacers originating from the main body and extending away from the main body separate from the plurality of clips, the plurality of spacers configured to wedge the main body within the wall opening.

9. The snap-in electrical box cable clamp of claim 5, wherein the plurality of clips comprises two pairs of clips on opposing sides of the main body wherein each pair of clips is configured to snap onto and hold the cable clamp to an edge of the wall opening of the electrical box.

10. The snap-in electrical box cable clamp of claim 5, further comprising a release arm integrated into the main body and configured to control a radial position of the second portion of at least one of the plurality of clips to selectively release the cable clamp from the edge of the wall opening.

11. A snap-in electrical box cable clamp comprising:

a one-piece, hollow, cylindrical main body configured to provide a pathway for an electrical cable through a wall opening in a wall of an electrical box, wherein the cylindrical main body has a continuous, uninterrupted circumferential wall at the top end of the main body;

a clamp positioned on a top end of the main body and configured to grip the electrical cable, wherein the electrical cable passes through the clamp when the electrical cable extends along the pathway through the main body; and a plurality of clips originating from the main body and extending away from the main body, wherein the plurality of clips is configured to snap onto and hold the cable clamp to an edge of the wall opening of the electrical box with a midsection of the main body positioned between each pair of clips and the wall opening of the electrical box centered about the midsection of the main body.

12. The snap-in electrical box cable clamp of claim 11, wherein the clamp has at least one screw configured to tighten the clamp to grip the electrical cable.

13. The snap-in electrical box cable clamp of claim 11, wherein each clip of a first portion of the plurality of clips is oriented in a downward direction and each clip of a second portion of the plurality of clips is oriented in an upward direction opposite the downward direction.

14. The snap-in electrical box cable clamp of claim 13, wherein each clip of the first portion of the plurality of clips is vertically aligned with a corresponding clip of the second portion of the plurality of clips to form a pair of clips and wherein each pair of clips is configured to snap onto and hold the cable clamp to an edge of the wall opening of the electrical box.

15. The snap-in electrical box cable clamp of claim 11, further comprising a plurality of spacers formed integral with the main body, originating from the main body and extending away from the main body separate from the plurality of clips, the plurality of spacers configured to wedge the main body within the wall opening with the wall opening centered about the midsection of the main body.

16. The snap-in electrical box cable clamp of claim 11, wherein the plurality of clips comprises two pairs of clips on opposing sides of the main body wherein each pair of clips is configured to snap onto and hold the cable clamp to an edge of the wall opening of the electrical box.

17. The snap-in electrical box cable clamp of claim 11, further comprising a release arm integrated into the main body and configured to control a radial position of a portion of at least one of the plurality of clips to selectively release the cable clamp from the edge of the wall opening.

* * * * *